United States Patent [19]

Harms

[11] 3,758,725

[45] Sept. 11, 1973

[54] SWITCHING SIGNAL CONVERTER FOR A TIME MULTIPLEX PCM TRANSMISSION SYSTEM

[75] Inventor: Wolf-Henning Harms, Berlin, Germany

[73] Assignee: Krone GmbH, Berlin-Zehlendorf, Germany

[22] Filed: Apr. 20, 1971

[21] Appl. No.: 135,605

[30] Foreign Application Priority Data

Apr. 20, 1970 Germany .................. P 20 18 931.5

[52] U.S. Cl. .......................... 179/15 BY, 179/16 EC

[51] Int. Cl. ................................................ H04j 3/12

[58] Field of Search ................... 179/15 BY, 16 EC; 325/38 A

[56] References Cited

UNITED STATES PATENTS

| | | | |
|---|---|---|---|
| 3,492,434 | 1/1970 | Michel | 179/15 BY |
| 3,394,230 | 7/1968 | Kinder | 179/15 BY |
| 3,274,611 | 9/1966 | Brown | 325/38 A |
| 3,518,662 | 6/1970 | Nakagome | 325/38 A |

FOREIGN PATENTS OR APPLICATIONS

| | | | |
|---|---|---|---|
| 1,153,087 | 8/1963 | Germany | 179/15 BY |

*Primary Examiner*—William C. Cooper
*Assistant Examiner*—David L. Stewart
*Attorney*—Edwin E. Greigg

[57] ABSTRACT

A telecommunications circuit for a telephone exchange installation for the conversion of switching signals which occur on more than two connecting wires with more than two states. The circuit includes separate logic elements arranged to advantageously utilize the laws of a particular switching plan such that less bits are required for marking code words than would be theoretically required on the basis of the number of different switching markers.

9 Claims, 5 Drawing Figures

PATENTED SEP 11 1973

3,758,725

SHEET 1 OF 4

Inventor:
Wolf Henning Harms
by
Edwin E. Greigg

Fig.2

| | Switching Signal | Potential State in forward direction | Potential States in backward direction | forward bits a b c | backward bits a b c |
|---|---|---|---|---|---|
| Rest | Free selector | — | -on c | 0 0 0 | 0 L L |
| | Free selector | — | ho-on c | 0 0 0 | 0 L 0 |
| Forward | To be busy | +on c | -on c | 0 0 L | 0 L L |
| | Busy receive signal | +on a | -on c | 0 0 L | 0 L 0 |
| | Number selection | +-Impulse on a | -on a | $L_{Imp}$ 0 L | 0 L 0 |
| | Long distance signal | -on b | -on a | $L_{Imp}$ L L | 0 L 0 |
| Backward | End of selection | -on b | { +on b<br>-on a | $L_{Imp}$ L L | L L 0 |
| | Busy answering signal | — | +on b | 0 L L | L L 0 |
| | Start signal a) Local | — | { Apply -on b<br>Separate -on a | 0 0 L | 0 0 0 |
| | b) Long distance | — | { -on a<br>+on b | 0 0 L | L L 0 |
| | Clearing signal a) Local | — | { -on b<br>+-Impulse on a | 0 0 L | $L_{Imp}$ 0 0 |
| | b) Long distance | — | { -on a<br>+-Impulse on b | 0 0 L | $L_{Imp}$ L 0 |
| | Release | Separation of -at c | — | 0 0 0 | 0 0 0 |
| | Intercept | — | { no-on a and b<br>+on a | 0 0 L | L L L |
| | Non-metering | — | no-on a and b | 0 0 L | 0 L L |
| | Metering during telephone | — | { -on a<br>-Impulse on b | 0 0 L | L $0_{Imp}$ 0 |

SWITCHING SIGNAL CONVERTER FOR A TIME MULTIPLEX PCM TRANSMISSION SYSTEM

BACKGROUND OF THE INVENTION

This invention relates to a circuit for conversion of switching signals which occur on more than two connecting wires with more than two states. The switching signals constitute a supply of switching signals called a switching signal plan. These switching signals are transmitted as signal code words via a DC-impenetrable channel of a time-multiplex transmission section or line. The signals are transmitted via a PCM transmission in the forward and backward direction. After the PCM signal code words are passed through the time-multiplex transmission section, they are decoded into the original switching signals. The connection wires have one segment each located on the side of the transmitter called the forward side corresponding to transmission in the forward direction, and one segment each on the side of the receiver called the backward side corresponding to transmission in the backward direction.

The switching signals are used for putting through transmission channels and also for the determination of all operational states of telephone lines, which is why every telephone network has its own switching signal system which may be referred to as a switching signal plan.

The statements which have just been made and which were partly somewaht simplified will now be spelled out more precisely in connection with FIGS. 1 and 2.

With the exception of the dotted-line block which represents a "time-multiplex transmission system," FIG. 1 shows a customary automatic exchange system. A call connection is established from a telephone A of a calling or dialing subscriber by having him dial the subscriber number of a subscriber at a telephone B. The call is completed via a call finder AS and various dialing stages or selectors, in this case, a first group selector I.GW to a fourth group selector IV.GW, and a final connector or line selector LW. Between the individual selectors, as well as the calling scriber A and the call finder AS, on the one hand, and the final line selector LW and the called subscriber B, on the other hand, there are three connecting wires *a*,*b*,*c* and two connecting wires *a*,*b*, respectively. The indexes S, E, of *a*, *b*, *c* identify the transmitter side (S) and receiver side of the time-multiplex transmission system as viewed in the drawing; however, it should be noted that transmissions may take place in either direction.

The selectors are adjusted in accordance with the particular conversation conditions, including the subscriber number through the switching signals which are exchanged between the various selectors via the three-wire connecting lines.

The switching signals, authorized by the German Federal Post Office for the Public Telephone Network, have been standardized in the so-called Impulse Signal Plan (IKZ 50). Accordingly, the wires are either connected, in terms of potential, with the ground (plus potential) or the negative pole of the exchange battery (minus potential) in the exchange or they are free in terms of potential. Furthermore, all wires are basically used in both directions, that is, in the direction in which the connection is established from the calling subscriber to the subscriber who is called as well as in the opposite direction.

The signals, which are used in the direction in which the connection is established, that is to say, in the direction from subscriber A to subscriber B, are called forward (VW) signals, whereas those which are sent in the opposite direction are called backward (RW) signals. VW is taken from the German word "vorwaerts" meaning forward, while RW is taken from the German word "rueckwaerts" meaning backward.

The first four columns in FIG. 2 show the signals according to the Signal Plan IKZ 50 of the German Federal Post Office (see, for instance, R. Krause," Ortsaemter mit Waehlbetrieb," [local exchanges with dialing], 1962, pp. 186 ff.) with their associated DC potential states on the three wires *a*, *b*, *c*. Only that particular potential and that particular wire which are characteristic for the switching signal have been illustrated. The states on the other wires that are involved in each case are not given again here.

For example, "+ on *c*" means that the positive potential has been applied to wire *c*. A long horizontal stroke indicates the absence of the application of potentials on all three wires *a*, *b*, *c*, in the particular direction. All switching signals according to the Switching Signal Plan IKZ 50 are thus illustrated in such a way that the wires are loaded with plus potential (+) or minus potential (−) or they are at no-potential and free.

Let us now briefly sketch the way a connection is established with different signals without considering the time-multiplex transmission system:

When subscriber A picks up the receiver, a DC-loop is closed so that the call finder AS will be switched to the subscriber A and connects him with the first group selector I.GW. Subscriber A then dials the first digit of the subscriber number of subscriber B. Because of the selector impulses generated (in FIG. 2, see signal "number selection [dialing]" and the pertinent entry in column 3), the first group selector I.GW is switched to the group corresponding to the first digit. Within this group, the first group selector, I.GW is switched to a free or unoccupied second group selector II.GW. Whether the subsequent selector is free or busy is now determined by the signals "selector free" or "selector busy" (see also FIG. 2, column 4): A minus potential on the private C wire in the reverse direction means 37 free" (according to IKZ 50, there is no minus potential here), while no-potential means "occupied" (busy).

If the next following selector is free, then a positive potential is applied to the private C wire in the forward direction, according to the signal "occupy" and this selector is thus occupied.

According to the signal "number dialing or selection" (see FIG. 2, in the forward direction, positive impulses are given off to tip wire *a* from the first group selector I.GW during the dialing of the following digits of the subscriber number of the subscriber B so that the following group selectors will be switched to the particular group.

If one of the group selectors is switched to a following free selector, then the wires *a*, *b* (tip wire, ring wire) are galvanically put through to the next selector. The occupation of the particular following selector as the connection is established occurs again in the manner already described. The last two positive potential impulse series, corresponding to the last two digits of the phone number of subscriber B, is picked up by line selector LW which is switched to the subscriber B who has been called.

The automatic exchange system described in connection with FIG. 1 involves the great disadvantage that, using the connecting line, consisting of only three wires (*a*, *b*, *c*), one can, in each case, establish only a single connection between two telephone subscribers. In other words, after the connection is put through, it is possible to transmit only a single conversation.

This is why automatic exchange systems, or, generally, transmission systems, have been developed which, on a time-space or carrier-frequency-multiplex basis, permit the multiple utilization of a two-wire connecting line for several telephone calls to which is associated in each case one communications channel.

Of special interest here are time-multiplex transmission systems with pulse code modulation (PCM), hereafter referred to as PCM-Systems, for short.

In contrast to carrier-frequency systems, in which the transmission link is established through frequency grading of the communications channels, information is transmitted in PCM systems in digital form. More accurately (see, for example Prospectus "Pulscodemulations-Geraet PCM 24" (Pulse Code Modulation Unit Model PCM 24), by AEG-Telefunken, 1968), a pulse amplitude modulation (PAM) takes place prior to pulse code modulation. To eastablish the PAM signal, amplitude samples are taken from the voice signal at certain identical time intervals. The amplitude range of the PAM signal is subdivided into a certain number of intervals which, in each case, are characterized by a state number representing a quantitative expression of amplitude. The state numbers, which are associated with the individual amplitude intervals, are converted into several code words for purposes of transmission. Since the time duration of the digital signal thus created is very much shorter than the time interval of two scanning samples of the same voice signal, more channels can be scanned in the time-multiplex between the code words of one channel. The totality of the code words which come out during a single scanning of conversations associated with all channels, constitutes a so-called frame.

On the receiving side, the code words, associated to the individual communications channels, are again decoded into amplitude values. The multi-channel PAM signal, obtained through decoding, is then distributed over the other channels and is so demodulated, for each channel, that the original voice signal will once again essentially come out of the recovered amplitude samples.

If such a PCM system is to be used in automatic exchange systems as shown in FIG. 1 between the first group selector I.GW and the second group selector II.GW, then, out of the total available communications channels, a portion must be set aside for the transmission of switching signals so that one can distinguish between voice channels for the transmission of the pure voice after connection has been established between two subscribers and signal channels for the transmission of switching signals for the purpose of establishing the connection. It goes without saying that the type of code words to be transmitted per channel, that is, their bit number, will also depend on the number of the channels. The greater the number of channels, the less time can be allocated to a channel during one frame. This is tantamount to a reduction of the bit number of each channel code word.

The PCM system 32 (30) of the CEPT, for example, has 32 channels which are made up of 30 voice channels, one signal channel, and one synchronization channel. Here, in a manner similar to the PCM system T 1 of the Bell Company and PCM 24 of the British Post Office, there are provided eight bits per voice channel and per signal channel. With the eight bits of the single signal channel it is thus necessary, in these PCM systems, to transmit switching signals for the telephone conversations which come about through the 30 voice channels.

For the conversion of the switching signals in each particular network into a code word of the signal channel in the forward and backward direction, a circuit is provided which consists of two halves, that is, a transmitter-side signal converter $KzU_S$, which lies in the direction of the way in which the connection is built up before the transmission section and a receiver-side signal converter $KzU_E$ which is connected in after the transmission section. The coders and decoders, which are available in a complete PCM time-multiplex transmission system for the coding or decoding of a voice signal into the code words of the voice channels, are not illustrated in FIG. 1 because the invention is not particularly directed to that.

The coding of the voice signal can be omitted altogether which, for example, is the case with an already proposed signal time-multiplex transmission system (cf., DT-OS [German Pat. No.] 1,762,426), in which only the signals of, for example, 30 telephone connections taken from their 30 *a*-,*b*-, and *c*-wires [tip, ring, and private wires] are scanned in succession via a time switch and are then likewise transmitted, in the time-multiplex method, via a double wire in the forward direction and a double wire in the backward direction. The voice frequency of the telephone connections, on the other hand, continues to be transmitted in the known manner via the available 30 tip and ring wires [*a*-, *b*-wires]. This makes for a considerably longer transmission section because the DC potentials of the switching signals, which are sensitive to long lines, need not longer be transmitted. At the same time it saves 28 private wires (*c*-wires). However, there must be provided, between every triple arrangement of tip, ring, and private (*a*, *b*, *c*) wires and the time switch, a signal converter on both sides of the transmission section.

Only at least three-wire traffic could be considered in connection with the use of the signal converter (KzU). In the case of connection lines with two wires, we are generally dealing only with subscriber lines from the subscriber to the first telephone exchange or we are dealing with lines on which a signal conversion has already been accomplished through relay circuits by means of DC, AC, audio-frequency conversions or the like. In these cases, it is no longer necessary to use signal converters.

Referring once again to FIG. 1, the transmitter-side signal converter $KzU_S$ at first has the function of picking up the analog DC potentials of the VW signals on the wires $a_1$, $b_1$, $c_1$ and converting them into digital signal code words suitable for PCM transmission. These signal words consist of signal bits, or, more accurately speaking, forward signal bits referred to as VW bits, for short. The term "analog" here has been selected for somewaht simplifying purposes because the signals cannot assume any desired arbitrary value. These signal words, consisting of VW bits, are routed via the transmission section to the receiver-side signal converter $KzU_E$ which converts the signal words from VW bits into exactly the combinations of DC potentials on the wires $a_E$, $b_E$, $c_E$ which the transmitter-side signal converter $KzU_S$ has found as VW signals.

In a similar manner, the combinations of DC potentials are converted on the $a_E$, $b_E$, $c_E$ wires of the RW signals, by the receiver-side signal converter $KzU_E$ into corresponding signal words of backward or reverse signal bits referred to as RW bits. These signal bits are reconverted by the transmitter-side signal converter $KzU_S$ into the original combinations of DC potentials.

As said before, the switching signals, according to the Signal Plan IKZ 50 of the German Federal Post Office, are represented by a maximum of three different potential states on three different wires so that there are $3^3 = 27$ different potential combinations. In order to code these 27 different potential combinations digitally, one would thus have to get one signal word with five bits ($2^5 = 32$). In the single signal channel, with a total of eight bits, which is provided especially in the known PCM systems, one could however, during one frame transmit only the switching signals for a single switching channel, in each case, and that would leave us with three bits. That means that the switching signals of a certain voice channel are transmitted at a time interval which encompasses a larger number of frame intervals. As a result there is a relatively high error rate for the time-multiplex transmission of switching signals.

A 24-channel PCM short-distance system has been described (cf. SEL-Nachrichten [SEL News], 1968, No. 1, pp 1 ff.,) having four independent wires *a–d* available for every voice channel. The signal information present on the four wires is processed via scanning switches, and the signal information of all 24 channels appears on a common multiplex line in corresponding sequence. Since only two states "signal" or "no signal" can occur there, the wires, quite disadvantageously, cannot accept or pick up any three different DC potential states, as according to IKZ 50 of the DBP (German Federal Post Office) which is why the signal information is directly blended into the pulse frame via a gate circuit.

In another known time-multiplex system with PCM (see prospectus "pulscodemodulations-Geraet PCM 24" of AEG-Telefunken, 1968) four frames which run one after the other in terms of time, constitute a superframe, Through each frame eight bits, each, are transmitted for each one of the 24 channels, one after another, in terms of time. The eighth bit of each channel within the first-third frames serves for the transmission of switching signals. It is also stated that a maximum of three signal channels can be transmitted along with this. The signal converter is connected to three wires *a*, *b*, *c* (tip wire, ring wire, private wire), but there is only the possibility of transmitting, during 4 frames each time, $2^3$ switching signals, per address.

SUMMARY OF THE INVENTION

In contrast, it is the purpose of this invention to provide a switching signal converter of the type wherein the digital signal words, in each case representing one switching signal, comprise less than five bits in order to facilitate more frequent scanning of the switching signal, so that the distortion in the transmission of the switching signals through the time-multiplex transmission section will be reduced.

This problem is solved in the following manner: a signal converter is associated with each transmitter-side (sending-side) and with each receiver-side (receiving side) segment of all connecting wires. This signal converter obtains the first or initial bits from each switching signal fed in. Said bits, directly or through at least several initial logic members, connected in after the converters for the purpose of tying in at least several of the first bits, constitute the bits of the pertinent signal word. These bits directly or through second logic members, for the tying in of the signal word bits, are transmitted through the time-multiplex transmission section in the forward or backward direction, constituting second bits. These bits can be activated through switches in order to load the connection wire segments with DC potentials from DC potential sources in accordance with the just transmitted switching signal. The logic tables of the converters and the logic members using the interconnections between the occurrence of the various DC potentials on the individual connection wire segments for the various switching signals, are so provided that the bit number of the signal code words will be as small as possible.

BRIEF DESCRIPTION OF THE DRAWINGS

FIG. 2 represents a compilation of the DC switching signals used in the automatic exchange system according to the Switching Signal Plan IKZ 50 of the German Federal Post Office, and corresponding signal bits produced by the switching signal converter in FIG. 3;

Figure 1:
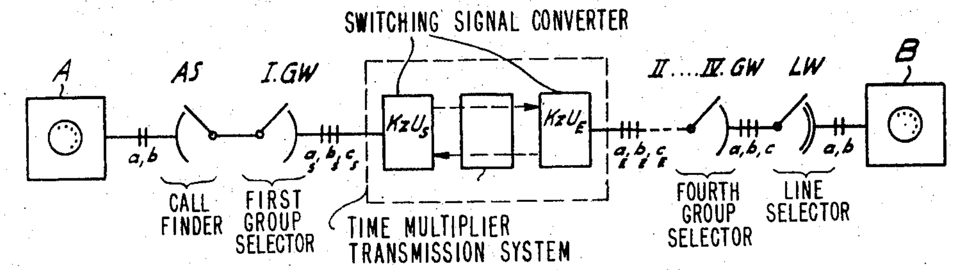
FIG. 1 represents a known exchange system for automatic dialing connection between two telephone subscribers, whereby a time-multiplex transmission system with a switching signal transverter is connected into the exchange system.

It goes without saying that the reduction in the number of bits of the signal words to less than 5, a reduction which we get as a result of the theory presented in this invention, depends on the particular switching plan to be observed, that is to say, on the type of interconnections between the occurrence of the various DC potentials on the individual connecting wire segments for the DC potentials. With respect to the Signal Plan IKZ 50, which the German Federal Post Office prescribes for the public telephone network, a reduction from five down to only three bits of the signal words is possible as will be hereinafter shown in detail.

A reduction of the signal word bit number achieved by means of the signal converter circuit arrangement of the present invention, by only one bit, from five bits down to four bits, offers the advantage that, in a signal channel with a total of eight bits, such as it is provided in the currently known and above mentioned PCM time-multiplex systems, the signals of two voice channels can be transmitted simultaneously in the signal channel. If the bit number is reduced by another bit, this surplus bit can be used for the faster scanning of the switching signals in order to increase the error-proof nature of the systems. The same applies, when, in a comparatively simple switching plan, the bit number of the signal word can be reduced to only two.

By "interconnections between the occurrence of the various DC potentials on the individual connecting wire segments for the individual switching signals" it is meant that different switching signals identical to each other in terms of DC potential appear at varying times and therefore do not cause any confusion. As a result of these circumstances, there is a reduction in the number of switching signals of the particular switching signal plan, which differ in terms of DC potential as against the theoretically possible maximum number of different combinations of DC potentials, which can assume three different values. On the three connection wire segments this is equal to 27 ($3^3$).

This does not mean at all that the utilization of interconnections is fully exhausted. It is particularly practicable to use through the first logic members initial bits which are associated with DC potentials that occur on at least one certain specific connecting wire segment of the transmitter side or the receiver side. That is, after the expiration or run-out of one or more switching signals, the DC potential will remain constant for the build up of the signal word by means of a switching signal which follows in terms of time and which consists of DC potentials on the remaining two or one connecting wire segments of the same side of the time-multiplex transmission section, that is, segments which are different from the determined specified ones. Through the second logic members, on the other side, the decoding of these bits is accomplished for the purpose of activating the switch of the corresponding remaining connecting wire segments on the other side.

The interconnection between the occurrence of the varying DC potentials on the individual connecting wire segments is thus the kind of interconnection which means that a bit, associated with a certain specific connecting wire segment, provided is does not change its value over a longer period of time, is used for the transmission of information via DC potentials on other connecting wire segments.

In order to make sure that this will, wherever possible, not bring about any impermissible influencing of the connecting wire segment associated with the constant bit on the other side of the time-multiplex transmission segment, advantageously at least one storage unit on the other side is provided which will store the signal word bit values corresponding to the DC potentials that remain constant and which, during the storage duration, will keep the switch associated with the corresponding specifically determined connection wire segments on the other side blocked.

If the switching signal plan is identical to the Impulse Signal Plan IKZ of the German Federal Post Office, the interconnection recognized and utilized according to the invention then consists in the fact that the receiver-side segments of the *a* and *b* connecting wires never reveal the same DC potential for the normally used switching signals, whereby there is a negative potential constantly at one of these connecting wire segments (see FIG. 2, colum 4).

In this case, the signal potential combinations on the receiver-side segments of the *a* and *b* wires can be illustrated by two signal bits, that is, one *a* and one *b* bit:

The *b* bit is, by definition, that bit which tells on which of the two wire segments the negative potential lies, while the *a* bit, by definition, is that bit which indicates the potential state of the particular other wire segment.

Without this rule, it would be necessary to transmit nine DC potential combinations, for every three states on the two receiver-side segments of the *a* and *b* connecting wires ($3^2 = 9$). In other words, four bit signal words ($2^4 = 16$) would be required. According to the present invention, only two signal bits are necessary for the signals which are determined through potential states on the wires *a*, *b* designated the bit and ring wires,respectively.

For the receiver-side segment of the third or private wire, designated the *c* wire, it is necessary, according to IKZ 50 (see FIG. 2, column 4), to report back, in the backward direction, only two states (negative potential or no-potential) and a single signal bit, called the C-bit.

For the transmit-side segments of the connecting wires (see column 3, FIG. 2), it is sufficient to have one three-bit signal word on the basis of the smaller number of differeing DC potential states (a total of only six different states).

With the help of this background knowledge, a preferred embodiment of the switching signal converter arrangement according to the invention may be realized in that the "first" mentioned converter, on the receiver-side segment of the a-connecting wire (tip wire), has the following code scheme or logic table:

| Potential State in Backward Direction of Connection Establishment | Output 1 | Output 2 |
|---|---|---|
| Minus (negative) potential | O | O |
| Plus (positive) potential | L | L |
| No-potential (potential-free) | L | O |

The"second" mentioned converter on the receiver-side segment of the b-connecting wire, has the same code scheme. The output 2 of the first converter and the output 2 of the second converter constitute the two inputs of a first OR member which belongs to the receiver-side first logic member and on whose output there occurs, as first bit, a backward a-bit. This a-bit is transmitted by the time-multiplex transmission section in the backward direction. The output 1 of the second converter gives off a backward b-bit which is transmitted by the time-multiplex transmission section in the backward direction.

An exception to the above-formulated rule for the switching signals of IKZ 50 however emerges for the switching signal "intercept" condition in which there is a positive potential on the receiver-side segment of the a-connecting wire, while, on the receiver-side segment of the b-connecting wire there prevails a no-potential. The same is also true of the signal "non-metering or non-registration" in which there is a negative potential on none of the receiver-side segments of the a-and b-connecting wires.

The advantage of three-bit signal words for the IKZ 50, which is obtained through the invention, is preserved by constructing the signal converter arrangement so that the "third" named converter on the receiver-side segment of the c-connecting wire has the following code scheme or logic table:

| Potential State in Backward Direction of Connection Establishment | Output |
|---|---|
| Minus (negative) potential | L |
| Plus (positive) potential | O |
| No-potential (free potential) | O |

The output 1 of the second converter constitutes an input of a first AND member belonging to the receiver-side first logic members. The other input of that first AND member is the output 1 of the first converter. The output of the AND member constitutes one input of the second OR member and the output of the third converter constitutes the other input of the second OR member belonging to the receiver-side first logic members. At the output of this second OR member there appears, as first bit, a backward c-bit which is to be transmitted by the time-multiplex transmission segment into the backward direction. A second AND member belonging to the transmitter-side second logic members receives the backward c-bit into one input. A forward c-bit is fed into another input of this second AND member, said forward c-bit being stored by the transmitter-side storage unit during the switching signal "occupy" and being transmitted in the forward direction by the time-multiplex transmission section. The output of the second AND member is connected to other AND members, belonging to the transmitter-side second logic members, through which some of the switches for the transmitter-side segment of the *a* and *b* connecting wires can be activated.

In this model, one of the previously mentioned interconnections is especially applied in the following manner: Using the fact that, normally, the receiver-side segment of the c-connecting wire does not allow its potential state during existing connections so that the pertinent c-bit of the signal words is constantly "zero" then, if there should be, in spite of this, an in-between-time change in this c-bit, in the version of the switching signal converter arrangement according to the invention, then this between-time change should not have any effect upon the transmitter-side segment of the c-connecting wire. This is so on account of the storage unit, because the pertinent switch belonging to that c-connecting wire, as stated before, is kept closed by the storage unit throughout the entire duration of the connection.

In order to extensively avoid the danger of an oscillation excitation in the signal converter arrangement according to the invention, there is associated with several converters at least one, each suppressor. Upon activation of one of the pertinent switches, the suppressor will prevent the particular converter from performing a sensing and converting function for the purpose of putting a potential on the pertinent connecting wire segment.

Finally, to provide security against breakdowns, such as impulses or relay bounces induced on the time-multiplex transmission section, there is provided on both sides of the time-multiplex transmission section, one, each, for every bit of the signal words, a delay storage unit. The delay storage unit is immediately adjacent to the time-multiplex transmission section. The delay storage unit will pass the incoming bit on only if a certain minimum time duration is exceeded.

Reference should be made to FIG. 2 in order fully to understand the ideas that constitute the basis of the invention, especially in connection with Switching Signal Plan IKZ 50: All signals are illustrated, according to the Switching Signal Plan IKZ 50, by a combination of positive potential, negative potential, and no-potential on the three wires *a*, *b*, *c*, (tip wire, ring wire, private wire). In the maximum case, it would be necessary to transmit, in case of three, each, possible potential states, for each one of the wires, *a*, *b*, *c*, or a total of $3^3 = 27$ different states for which (because $2^5 = 32$) we would require signal words consisting of five, each, signal bits.

With a total number of, for example, eight bits, this would entail a considerable effort in a PCM channel because, in that case, only the signal words of one voice channel could be placed in one signal channel. The surplus 3 bits could not be utilized, in other words, they would be redundant. The signal channel basically does not transmit any voice information; for that there are the extra (30) voice channels at eight bits, each. It is, however, desirable to get as much signal information as possible into one signal channel, wherever possible, the information for two voice channels, and moreover, one must gain as much scanning time as possible through free bits in order to avoid the distortions. This is why it is desirable to reduce the bit number.

The invention overcomes the aforementioned difficulty by getting along with one three-bit signal word for signals according to the Switching Signal Plan IKZ 50, instead of one five-bit signal word. Generally speaking, the invention provides for the conversion only of the non-redundant potential state combinations of the switching signals into signal words suitable for time-multiplex PCM transmission. This will now be explained in greater detail for the IKZ 50 switching signal plan:

Referring to the fourth column in FIG. 2 and the potential states in backward direction, it can be seen that certain interconnections exist between the appearance of the various potential states on the individual wires *a*, *b*, *c*. The rule is set that, basically, the wires *a*, *b* never reveal the same potential state in the backward direction, whereby there is a negative potential constantly at one of the wires *a*, *b*. In other words, if there is a negative potential on one of the two wires *a*, *b*, then there can only be either a positive potential or a no-potential on the other one of the two wires. Exceptions from this rule emerge only for the signals "interception," "non-metering or non-registration" and "metering during telephone conversation." These three exceptions will be described later on, however, they do not alter the application of the basic principle according to this invention in the case of IKZ 50.

In other words, if the just-formulated rule to the effect that the *a*, *b* wires never carry the same potential simultaneously, whereby a negative potential is constantly on one of the wires *a*, *b*, is valid, then the signal-potential-state combinations on the wires *a*, *b* can be coded by means of two signal bits, that is, one *a* and one *b* bit:

The *b* bit is, by definition, that bit which tells on which of the two wires *a*, *b* the negative potential lies. The *b* bit, here, for example, is "L" ("1") for the negative potential on the wire *b* and "O" for the negative potential on the wire *a*. The *a* bit is then, by definition, that bit which gives us the potential state for the particular other wire. The *a* bit, for example, here is "L" for the positive potential, "0" for no-potential.

Without this rule, it would be necessary to transmit nine state combinations in case of three, each, states on the two wires *a*, *b* (because $3^2 = 9$). In other words, four-bit signal words ($2^4 = 16$) would be needed. On the other hand, according to the invention, the transmission of two signal bits suffices for signals which, because of potential states, are determined only on the wires *a*, *b*.

For the third wire, the private wire $c$, there is derived from FIG. 2, the need for reporting back only two states (negative potential or no-potential) in the backward direction. One signal bit, called the c-bit, suffices for that.

For purposes of illustration in terms of 3-bit signal words, we can also think along the following lines:

According to column 4, it is necessary to transmit only eight different potential states or potential state combinations, with the exception of the switching signals "non-metering" "interception" and "metering during telephone conversation." The other possible states are redundant. Therefore, on account of $2^3 = 8$, the formation of three-bit words is sufficient if, only in the version of the signal converter, we make sure that only these state combinations are selected. For the forward direction (see column 3, FIG. 2), one three-bit signal word is certainly sufficient on the basis of a smaller number of varying potential states (a total of only six different states).

Figure 3:
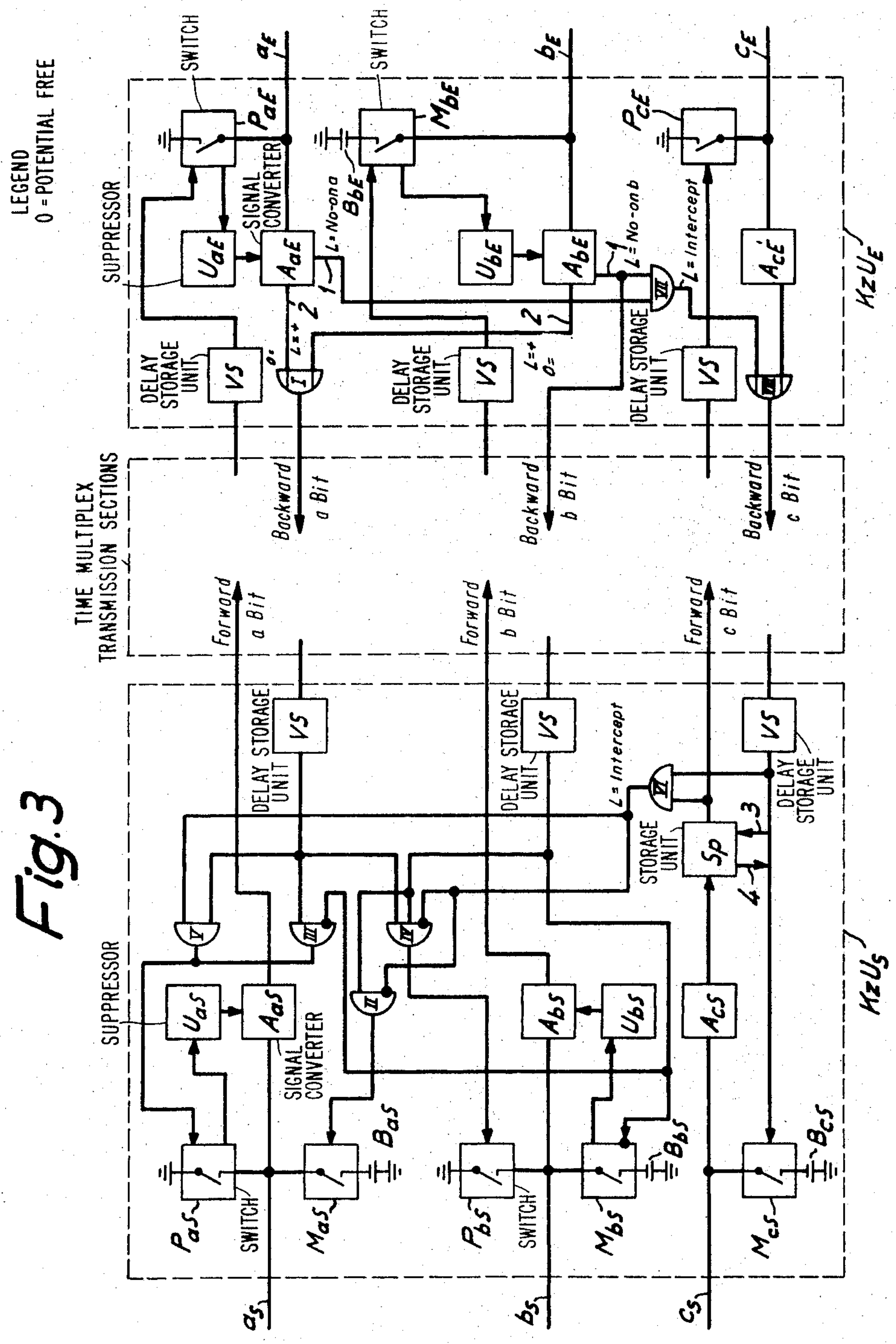
FIG. 3 is one example of the switching signal converter circuit arrangement according to the invention.

FIG. 3 shows an example of the time-multiplex transmission system illustrated in FIG. 2, whereby the switching signal converter circuit arrangement according to the invention is designed for the digital coding and the subsequent decoding of the switching signals according to the IKZ 50 switching signal plan of the German Federal Post Office.

Both the wires $a_S$, $b_S$ and $c_S$, which lie in the direction in which the connection is built up in front of the time-multiplex transmission section or which in other words are on the transmitter side, and the wires $a_E$, $b_E$ and $c_E$, which are arranged after the transmission section or on the receiver side, are scanned for their DC potentials by converters $A_{aS}$, $A_{bS}$, $A_{cS}$ or converters $A_{aE}$, $A_{bE}$, $A_{cE}$. That is to say, the DC potentials, which represent the analog signals, are converted into bits. In passing it may be noted that the indexes $a$, $b$, $c$ refer to the association of a certain structural component to wire $a$, $b$, $c$, while the symbol S refers to the pertinence to the transmitter-side signal converter $KzU_S$ and the symbol E refers to the pertinence to the receiver-side signal converter $KzU_E$.

The individual converters convert the DC potentials, which represent the analog signals, into bits. The bits, generated by the converters in the transmitter-side sectional converter $KzU_S$, are directly fed into the transmission section as VW bits. On the other hand, the bits, obtained by the converters in the receiver-side signal converter $KzU_E$, are logically tied in through first logic members in the form of one OR member I, one AND member VII, and one OR member VIII, so that (with the exception of the RW-b bit) only the bits at the output of these logic members serve as RW bits of the signal words.

The VW bits transmitted by the transmission section are used without any further logic processing for the purpose of activating switches $P_{aE}$, $M_{bE}$ and $P_{cE}$, in order to load the wires $a_E$, $b_E$ or $c_E$ with DC potentials. In other words, to ground them as positive potential connect them to a negative potential from battery $B_bE$. With regard to the labelling of the switches, P means the application of positive potential and M means the application of negative potential.

The RW bits of the signal words, transmitted by the transmission section, undergo logic tie-in through second logic members in the form of AND members II-VI, before they are fed into switches $P_{aS}$, $M_{aS}$, $P_{bS}$, $M_{bS}$ and $M_{cS}$, in order to apply a corresponding positive potential which may be a ground potential, or a negative potential from batteries $B_{aS}$, $B_{bS}$ and $B_{cS}$, to the transmitter-side wires $a_S$, $b_S$, $c_S$. Solid dots or points on the AND members II, III, IV signify inverting inputs as does the solid dot on switch $M_{bS}$.

In the receiver-side signal converter $KzU_E$ there are furthermore provided delay storage units VS. VS allow impulses coming from the transmission section going to the switches to pass through only after a certain time duration has been exceeded, for example, 4 msec, in order to separate the VW bits from disturbances, such as impulses or relay bounces induced on the transmission section. Similarly, delay storage units VC in the transmitter-side signal converter $KzU_S$ for the RW bits are provided.

Finally, between some of the switches and the pertinent scanner, there are suppressors $U_{aE}$, $U_{bE}$, $U_{aS}$, $U_{bS}$. When a potential is applied to the wires, the suppressors block the converters by means of the connected switch so that these scanners will not give off any bit. This avoids the danger of oscillations. The suppressors can be of known design. For example, they can come in the form of logic gate circuits.

In the transmitter-side signal converter $KzU_S$ there is furthermore provided a storage unit Sp in order to store the VW or RW-c bit, which will be described in greater detail below.

The converters $A_{aE}$ and $A_{bE}$, in contrast to the other converters, have not just one, but two outputs 1 and 2. The two converters $A_{aE}$ and $A_{bE}$, which have an identical structure, operate in accordance with the following logic table:

| Potential State on the Pertinent Wire in Backward Direction (that is, $a_E$ or $b_E$ for $A_{aE}$ or $A_{bE}$) | Output 1 | Output 2 |
|---|---|---|
| Negative potential | O | O |
| Positive potential | L | L |
| No-potential | L | O |

Figure 4:
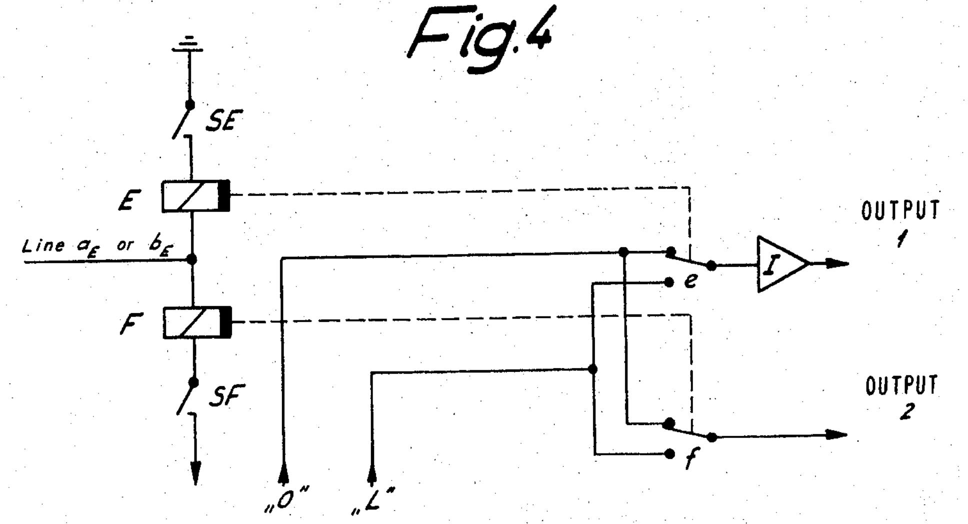
FIG. 4 is one example of converters of the switching signal converter circuit arrangement.

The converter $A_{aE}$ and $A_{bE}$ can, for example, be made in accordance with FIG. 4. The coils of two electromagnetic relays E and F are connected with wire $a_E$ or $b_E$ as the case may be. The relay F can be loaded via a switch SF with a negative potential, and the relay E can be loaded via a switch SE with a positive potential (here: ground potential). Relay contacts $e$ or $f$ are associated with relays E and F, respectively. Of these contacts, relay contact $e$ is connected via an inverter I with the output 1 while the relay $f$ is directly connected with the output 2. The relay contacts $e$ and $f$ can, in each case, be switched between two poles, one of which is connected with a voltage source for the logic "L" while the other one is connected for the logic "O."

From FIG. 4 it can be seen right away that the two switches SE and SF may not be simultaneously closed when it comes to scanning the wires $a_E$ or $b_E$ because otherwise both relays would be constantly pulled up due to the current from the ground to the negative potential. The switches SE and SF therefore are controlled by one, each, timing pulse, whereby the timing pulses are phase-shifted by 90°. The timing pulses are generated by conventional timing generators.

In order to get simultaneous scanning at outputs 1 and 2, as the overall results, in spite of the alternating closing of the switches SE and SF and thus despite the alternating sensing of the wires $a_E$ or $b_E$ by the two relays E and F, the relays E and F are delayed relays. That is to say they remain in the pulled-up state after the opening of the pertinent switch SF or SE and thus after the interruption of the current flowing through them for a certain time, that is to say, over several pulse periods.

The logic table given above for the converters $A_{aE}$ and $A_{bE}$ can quite readily be verified with the help of the example in FIG. 4 if it is kept in mind that, if current flows through the relays E or F, the relay contacts *e* or *f* are switched from the position shown in FIG. 4.

The function of the example in FIG. 3 will now be explained with the help of the time-wise development of the buildup of a special connection.

There is a negative potential on wire $c_E$ coming from the following selector if the latter is not occupied. The converter $A_{cE}$ determines this (cf., signal "selector free or available," column 4 in FIG.2) and the converter $A_{cE}$ transmits the backward-c-signal bit called RW-c-bit with the value "L" (=free, see FIG.2, last column) via the OR member VIII. The RW-c bit is transmitted in the backward direction via the transmission section to the transmitter-side signal converter $KzU_S$. As a result of this the switch $M_{cS}$ is connected in. The negative potential of the battery $B_{cS}$ is applied to the wire $c_S$ so that the same potential is established in this wire as in $c_E$.

In case the following selector is occupied, the scanner $A_{cE}$, on the other hand, does not find the negative potential and sends the RW-c bit with the value "O" (= occupied) in the backward direction (see symbol "selector busy" in FIG. 2). As a result of this the switch $M_{cS}$ remains open so that there will be no negative potential applied to the wire $c_S$.

In this way, the selector which is located on the control wire $c_S$ will always find that potential state, going in the forward direction, which the selector, lying on wire $c_E$, applies backward, although between the two selectors the transmission section adjoins as a DC-impenetrable system.

In c ase the selector connected to wire $c_S$ finds a negative potential, it is immediately tied up. As a result, the potential on wire $c_S$ drops and the pertinent scanner $A_{cS}$ accordingly sends a VW-c bit with the value "L" (=occupied [busy]). (See the switching signal "occupy" in FIG. 2 and next to the last column).

This VW-c bit is, on the one hand, stored in the storage unit Sp until the "break" or release switching signal comes in the forward direction (see FIG. 2, column 2). The arrow on line 3 of storage unit Sp means that the storage unit Sp can store only if the RW-c bit is equal "L" (= "selector free"). The arrow on line 4 means that, in case of storage of the "L" of the VW-bit the storage unit Sp keeps the switch $B_{cS}$ closed throughout the entire storage time, regardless of the changes in the RW-c bit.

From storage unit Sp the VW-c-bit with value "L" is also sent out over the transmission section. In the receiver-side signal converter $KzU_E$, the VW-c bit brings about the closing of switch $P_{cE}$. This applies a positive potential (e.g. a ground potential) to the wire $c_E$ so that the following selector will be occupied.

Let us now consider the wires $a_E$ and $b_E$ in the "resting" state:

At "rest," there is a negative potential on the wire $a_E$ from the following selector while the wire $b_E$ shows no-potential. This cannot be seen in FIG. 2 under "rest" because FIG. 2 only shows, in each case, that wire and that potential which are characteristic for the signal. For "rest" according to the above logic table of scanners $A_{aE}$ and $A_{bE}$ we thus get one, each, "O" at the output 2 of the scanners $A_{aE}$ and $A_{bE}$ so that "O" will also appear as RW-a bit at the output of the OR member I. On the other hand, the RW-b bit is equal to "L" in accordance with the bit at the output 1 of the scanner $A_{bE}$.

To determine whether there is a negative potential on the wire $a_E$ or on the wire $b_E$ and to evaluate this determination for the purpose of activating the transmitter-side signal converter $KzU_S$, it basically suffices to select one of the two sensing results obtained by converters $A_{aE}$ and $A_{bE}$ because the following applies according to the rule formulated above:

If a negative potential is not on wire $a_E$ then it is on $b_E$ and vice versa.

It is, however, advantageous to take the sensed results of the converter $A_{bE}$ because this rule is broken if, on the pertinent wire $b_E$, during a long-distance conversation (in contrast to local calls), counter or metering impulses arise with a negative potential in accordance with the switching signal "counting during long-distance conversation," (see FIG.2), while a sustained negative potential is simultaneously on $a_s$. The resultant information loss with regard to the state of wire $a_E$ however is not significant. In case of employment for long-distance calls, it is impossible, according to IKZ 50, to put a potential other than a sustained impulse potential on wire $a_s$ because the wire $a_s$ in this case is directly switched to a negative potential by means of direct switching, in other words, not via switch $M_{aS}$. The interruption of the switch $M_{aS}$ for RW-a-bits with the value "O" (= negative on $b_E$) remains without any effect.

The value "L" of the b-RW-bit thus means "no negative potential on wire $b_E$." This is tantamount to the application of a negative potential to wire $a_E$. Because of "O" at output 1 of the scanner $A_{aE}$ there is "O" at the output of the AND member VII and, because simultaneously there is no more negative potential on $c_E$ (already occupied), which is why the scanner $A_{cE}$ gives "O," there is "O" for the RW-c bit.

The RW-b bit with the value "L" is fed, in the transmitter-side signal converter $KzU_S$, into the AND member II. The latter's other inverting input is connected with the output of the AND member VI on which we get "O" because the RW-c-bit with the value "O" is fed into one input of the AND member VI. As a result of the inversion of the "O" at the output of the OR member VI, a "L" is thus indeed fed in also at the other input of the AND member II, so that the AND member II gives off a "L" for the purpose of closing the switch M. This applies a negative potential from the battery $B_{aS}$ to the wire $a_S$.

This means that the negative potential occurs on the wire $a_S$ as it does on the wire $a_E$.

The RW-a bit, which at "rest" is "O" for the case where the wire $a_E$ is non-grounded and potential-free (no-potential), does not bring anything about in the transmitter-side signal converter $KzU_S$. That is to say, the other switches $P_{aS}$, $P_{bS}$ remain open as can be seen directly from FIG. 3 as the bits fed into the AND member III, IV and V are considered.

If the positive impulses of the signal "number selection" (see FIG.2) are applied to the wire $a_S$ for the further establishment of the connection from the preceding selector (that is, the first group selector I.GW in FIG.1), then the converter $A_{aS}$ will transmit a sequence of subscriber B to the transmission section. After transmission through the transmission section, the receiver-side signal converter $KzU_E$ closes the switch $P_{aE}$ in terms of impulses. As a result of this the positive pulses of "number selection" are restored on wire $a_E$. While the switch $B_{aE}$ is closed, the output signal of converter $A_{aE}$ is suppressed by means of the suppressor $U_{aE}$ which can be controlled from switch $P_{aE}$ or the incoming VW-a bit and which acts upon the converter $A_{aE}$. This prevents the positive pulses of the number selection applied to the wire $a_E$ by the closed switch $P_{aE}$ from being scanned and being sent out as RW-a bits, which, as can readily be seen, would lead to the development of oscillations.

In case of a long distance call, a negative potential from a "long distance signal" (see FIG.2) can arrive simultaneously with switching signal "number selection" at wire $b_S$. The converter $A_{bS}$ gains one VW-b bit from that. In the receiver-side signal converter $KzU_E$, the VW-b bit closes the switch $M_{bE}$ so that a negative potential, corresponding to the "long distance signal," is also applied to the wire $b_E$. At the same time, the output signal of the converter $A_{bE}$ is here also suppressed by the suppressor $U_{bE}$, which is controlled by the switch $M_{bE}$ (or the VW-b bit), in order not to send the negative potential applied to the wire $b_E$ during the closing of the switch $M_{bE}$ back, via the converter $A_{bE}$, into the transmitter-side signal converter $KzU_S$.

By way of reply to the "long distance signal," the last-following selector (according to FIG.1, always the line selector LW), during the last "number selection," gives the backward signal "end of selection" (see FIG. 2). This is expressed as a positive potential on wire $b_E$. The signal "end of selection" is given off only by the line selection LW which, in the final analysis, is always applied to the $KzU_E$. This is so because, after every "number selection," the particular group selector is put through and because the next-following selector is then decisive for the transmission of the signal.

During the last "number selection," during which "end of selection" is transmitted, the line selection LW, in terms of signals is thus always on the receiver-side signal converter $KzU_E$. The converter $A_{bE}$ in this case at its output 1, gives off one "L" directly as RW-b bit and via the other output 2, via the OR member I, it gives off an "L" as RW-a bit. The RW-c bit continues to remain on "O." These RW bits are processed as follows after transmission through the PCM transmission section from the transmitter-side signal converter $KzU_S$:

The negative potential on $a_S$ is established via the AND member II by closing the switch $M_{aS}$, as described above.

The RW-a bit, with value "L" is simultaneously applied to the AND members III–V. It is however not routed on at the AND member V because the latter's second input is at "O" as the function of the AND member VI (RW-c bit "O" no intercept). At the AND member III, the "L" of the RW-b bit however is also not passed on because the other input is an inverting input. In other words, it converts the RW-b bit with the value "L" into one "O."

The AND member IV with three inputs is put through as follows: The RW-b bit is on the uppermost input likewise with the value "L" and we have a "O" on the lower, inverting input, coming from the AND member VI. In other words, after inversion, there is likewise an "L." This is why an "L" at the output of the AND member IV is obtained which closes the switch $P_{bS}$. This, in turn, applies a positive potential to the wire $b_S$ corresponding to the positive potential on wire $b_E$.

If the following selector now, according to the local "start sign" (see FIG.2) separates the negative potential from the wire $a_E$ and if this negative potential is then applied to wire $b_E$, then the scanner $a_{bE}$ also switches around and transmits an "O" to the PCM transmission section via its output 1 as RW-b bit. After transmission, the RW-b bit, in the transmitter-side signal converter $KzU_S$, closes the switch $M_{bS}$ via the latter's inverting input so that the negative potential is applied from battery $B_{bS}$ to the wire $b_S$. Simultaneously, switch $M_{aS}$ is open because the AND member II no longer puts through because of the "O" of the RW-b bit at one input.

Assuming that the RW-a bit with the value "L" simultaneously is obtained with the RW-b bit with the value "O" (for example, because of a "clearing signal"), this "L" is applied, by the AND members II–V only via the AND member III to the switch $P_{aS}$. This loads the wire $a_S$ with a positive potential. All other AND members now block, as we can see directly from FIG. 3, for the bit values assumed.

The initially mentioned exceptions to the above rule which is essential to the invention and which applies to the signals in the IKZ 50 switching signal plan of the German Federal Post Office will now be taken up. The exceptions are conditioned by the signals "intercept" and "non-metering" whereby a negative potential is constantly applied to one of the two wires $a_E$ and $b_E$. The signal "intercept" (see FIG. 2) is generated by virtue of the fact that a positive potential is applied to the wire $a_E$ while no negative potential is applied to the wire $b_E$, or, more accurately, while a no-potential condition prevails there. Similarly, there is a no-potential condition present on the wires $a_E$ and $b_E$ in connection with the signal "non-metering."

First of all only the case of the signal "intercept" will be taken up. If, in this case, the scanners $A_{aE}$ and $A_{bE}$ determine that neither the wire $a_E$ nor the wire $b_E$ have a negative potential on them, then both of them, from output 1 (see the above logic table) give the bit "L" (= no negative potential) into the AND member VII which thereupon feeds the bit "L" (= "intercept") into the OR member VIII.

Since both the RW-a bit and the RW-b bit have already been fully utilized for signal transmission, that is to say, since all possible combinations of these bits have been used up, it is one advantageous further development of the invention that use is made, for transmission of the signal "intercept" (and of the signal "non-metering"), of the fact that, normally, the private wire (c-wire) does not change its potential state during the existing connection so that the pertinent RW-c bit is constant "O." An in-between-time alteration of the RW-c bit does not have any effect upon the wire $c_S$ on account of the storage unit Sp because the storage unit Sp keeps the switch $M_{cS}$ — as we said earlier — closed during the entire duration of the connection. In other words, the intercept bit "L" can be routed from the AND member VII via the OR member VIII as RW-c bit to the transmission section and can be transmitted to the transmitter-side signal converter $KzU_S$.

For the signal "intercept" we furthermore get the value "L" for the RW-a bit and for the RW-b bit, as we can see directly from the logic table of the scanners $A_{aE}$ and $A_{bE}$.

The following operations then take place in the transmitter-side signal converter $KzU_S$:

If the VW-c bit signals the signal "occupy" through the value "L" (see FIG.2) and if simultaneously the RW-c bit arrives with the value "L," then only the signal "intercept" or "non-metering" (absence of negative counting) voltage at at $b_E$ is present. Both signals differ from each other only by the states on wire $a_E$. In case of "non-metering" there is no positive potential at $a_E$ on account of the no-potential and the RW-a bit therefore is not "L" but rather "O" so that the switch $P_{aS}$ is not closed. Otherwise, however, the operating steps in the signal converter are completely identical. Only in these two cases does the AND member VI give off a "L" to the AND member II–V. At the same time, a RW-b bit, coming from output 1 of the counter $A_{bE}$, appears with the value "L" which in itself means the following:

No negative potential on wire $b_E$. In other words, negative potential on $a_E$. The AND member II however prevents the application of the negative potential to the wire $a_S$ according to this value of the RW-b bit because, at its second, inverting input, the "L" given off by the AND member VI is a "O" after inverting. Through the RW-a bit with the value "L" on the one hand and the "L" bit from the output of the AND member VI, on the other hand, the AND member V is put through so that the switch $P_{as}$ is closed and the negative potential for intercept is applied to the wire $a_S$ in accordance with the positive potential on wire $a_E$.

It has thus been shown that, using the three-bit signal words in this invention, one can also digitally transmit the signals "intercept" and "no-metering" which differ from the general rule set up above.

Figure 5:
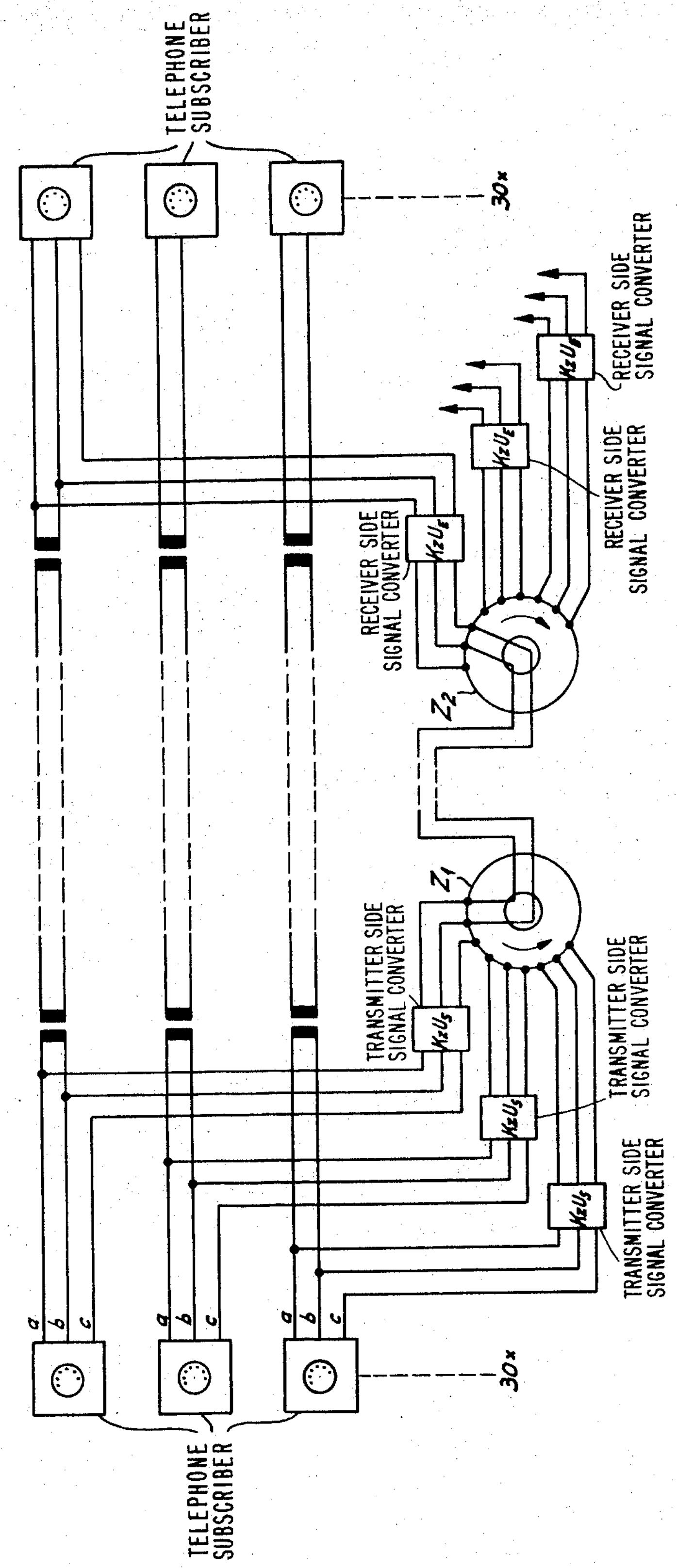
FIG. 5 is one possible use of the switching signal converter circuit arrangement in a signal-time-multiplex-transmission system proposed.

The signal converter according to the invention can also be advantageously used in the previously mentioned proposed signal time-multiplex transmission system, as explained in FIG. 5. According to this proposal, the signals of, for instance, 30 telephone connections, are taken enclusively from their 30 tip, ring, and private wires (in FIG. 5). Only the first three telephone connections have been shown. They are scanned one after another via a first time switch $Z_1$ and they are then likewise transmitted in the time-multiplex method, via a double wire in the forward direction and a double wire in the backward direction. The voice frequency of the telephone connections continues to be transmitted in an in itself known manner via the existing 30 tip and ring wires. The signals are recovered via a second time switch $Z_2$ and from there they are fed into the 30 tip, ring, and private ($a$, $b$, $c$) wires to the telephone subscribers who have been called.

The transmission system proposed facilitates a considerably longer transmission section when compared to the hitherto customary transmission, because the DC potentials of the switching signals, which are sensitive with respect to long lines, need no longer be transmitted. Besides, 28 private ($c$) wires in 30 telephone connections can be saved. This signal multiplex transmission system proposed can be implemented by connecting, in each case, between one triple set of tip, ring, and private wires and the time switches $Z_1$ or $Z_2$, the transmitter-side signal converter $KzU_S$ or the receiver-side signal converter $KzU_E$ in accordance with the invention.

What is claimed is:

1. A telecommunications circuit for a telephone exchange installation for the conversion of switching signals which occur on more than two connecting lines ($a$, $b$, $c$) with more than two states in which the switching signals constitute a supply of switching signals called a switching signal plan, wherein the connecting lines ($a$, $b$, $c$) include more than two sending-side lines ($a_s$, $b_s$, $c_s$) and an equal number of receiving-side lines ($a_e$, $b_e$, $c_e$) and wherein a time-multiplex PCM transmission section exists between the sending-side lines and the receiving side-lines; the switching signals being transmitted in the forward and backward direction via one each DC-impenetrable channel of the time-multiplex transmission section as signal code words which are to be decoded, after passing through the time-multiplex section, into the original switching signals; the improvement comprising a first plurality of signal converters having their respective inputs connected respectively to said sending-side lines ($a_s$, $b_s$, $c_s$) for converting switching signals appearing thereon into first bit signals constituting a pertinent signal code word and supplying them to said time-multiplex PCM transmission section for transmission, a second plurality of signal converters having their respective inputs connected respectively to said receiving-side lines ($a_e$, $b_e$, $c_e$) for converting switching signals appearing thereon into second bit signals, a first plurality of voltage sources (ground, $B_{bE}$, ground), a first plurality of switching means ($P_{aE}$, $M_{bE}$, $P_{cE}$) responsive to first bit signals received from said multiplex transmission section and connected respectively between respective ones of said first plurality of voltage sources (ground, $B_{bE}$, ground) and respective ones of said receiving-side lines ($a_e$, $b_e$, $c_e$) for selectively connecting said receiving-side lines to said first plurality of voltage sources (ground, $B_{bE}$, ground) in accordance with said first bit signals to thereby place particular signals with more than two possible states thereon, first logic circuit means (I, VII, VIII, direct connection 1 to $A_{bE}$) coupled to said second plurality of signal converters and responsive to output signals therefrom for selectively passing second bit signals to said time-multiplex PCM transmission section for transmission, second logic circuit means (II, III, IV, V, VI, connection to control of $M_{cS}$, connection to negated input of $M_{bS}$) responsive to the second bit signals received from said multiplex transmission section for developing control signals, a second plurality of voltage sources (ground, $B_{aS}$, ground, $B_{bS}$, $B_{cS}$), a second plurality of switching means ($P_{aS}$, $M_{aS}$, $P_{bS}$, $M_{bS}$, $M_{cS}$) responsive to said control signals received from said second logic cricuit means, and connected between said sending-side lines ($a_s$, $b_s$, $c_s$) and selected ones of said second plurality of voltage sources (ground, $B_{aS}$, ground, $B_{bS}$, $B_{cS}$) for selectively connecting said sending-side lines ($a_s$, $b_s$, $c_s$) thereto in accordance with said second bit signals whereby DC potentials in accordance with transmitted switching signals are applied to the sending-side and receiving-side lines.

2. A circuit arrangement according to claim 1, wherein said first logic circuit means includes a first OR member (VIII) having one of its inputs coupled to that one of said second plurality of signal converters ($A_{cE}$) which is connected to one particular receiving-side line ($c_e$) of said receiving-side lines for passing a bit signal related to potential on said particular receiving-side line ($c_e$) to said time-multiplex PCM transmission section, a first switching means ($M_{cS}$) of said second plurality of switching means associated with one line ($c_s$) of said sending-side lines being coupled to said time-multiplex PCM transmission section for receiving the bit signal from said OR member (VIII); wherein said first logic circuit means further includes an AND member (VII) having its inputs coupled to outputs of others ($A_{bE}$, $A_{aE}$) of said second plurality of signal converters and its output coupled to a second input of said first OR member (VIII) and wherein said first logic circuit means also includes a second OR member (I) having its inputs coupled to other out-puts of said others ($A_{bE}$, $A_{aE}$ ) of said second plurality of signal converters and its output coupled to said time-multiplex PCM transmission section; wherein said first logic circuit means still further includes a direct connection to said time-multiplex PCM transmission section from that output from a particular one ($A_{bE}$) of said others ($A_{bE}$, $A_{aE}$) of said second plurality of signal converters which is connected to said AND member (VII); and wherein said second logic circuit means includes a plurality of further AND members (II–VI) having inputs coupled to said time-multiplex PCM transmission section and a negated control input of a second switching means ($M_{bS}$) of said second plurality of switching means coupled to said time-multiplex PCM transmission section for decoding bits received therefrom to provide switching signals for particular switches (($P_{aS}$, $M_{aS}$, $P_{bS}$, $M_{bS}$) of said second plurality of switching means associated with remaining ones ($a_s$, $b_s$) of said sending-side lines.

3. A circuit arrangement according to claim 2, further comprising at least one storage unit ($S_p$) coupled between said first switching means ($M_{cS}$) of said second plurality of switching means and the output from that one ($A_{cS}$) of said first plurality of signal converters which is associated with said first switching means ($M_{cS}$) for storing signal word bit values corresponding to the DC potential which remain constant and which, during the duration of storage, keeps said first switching means ($M_{cS}$) associated with the corresponding specifically determined sending-wire ($c_s$) locked.

4. A circuit arrangement according to claim 3, wherein the switching signal plan is the impulse signal plan IKZ 50 of the German Federal Post Office, wherein a first converter ($A_{aE}$) of said second plurality of signal converters which is connected to a first line ($a_e$) of said receiving-side lines of a first ($a$) connecting line of said connecting lines ($a$, $b$, $c$) has the following code scheme or logic table:

| Potential State in Backward Direction of Connection Establishment | Output 1 | Output 2 |
|---|---|---|
| Negative potential | O | O |
| Positive potential | L | L |
| No-potential | L | O |

and a second converter ($A_{bE}$) of said second plurality of signal converters which is connected to a second line ($b_e$) of said receiving side lines of a second ($b$) connecting line of said connecting lines ($a$, $b$, $c$) has the same code scheme such that a second output of said first converter ($A_{aE}$) and a second output of said second converter ($A_{bE}$) constitute two inputs of a first OR member (I) on whose output there appears, as first bit a backward-a bit to be transmitted by said time-multiplex PCM transmission section in backward direction, said OR member belonging to said first logic circuit means and such that a first output of said second converter ($A_{bE}$) gives off a backward-b bit to be transmitted by said time-multiplex PCM transmission section in the backward direction.

5. A circuit arrangement according to claim 4, wherein a third converter ($A_{cE}$) of said second plurality of signal converters which is connected to a third line ($c_e$) of said receiving-side lines of a third connecting line ($c$) of said connecting lines ($a$, $b$, $c$) has the following code scheme or logic table:

| Potential State in Backward Direction of Connection Establishment | Output |
|---|---|
| Negative potential | L |
| Positive potential | O |
| No-potential | O |

a first output of said second converter ($A_{bE}$) constituting an input of a first AND member (VII), said first AND member belonging to said first logic circuit means, said first logic circuit means having another input, this other input being a first output of said first converter ($A_{bE}$), a second of said first AND member (VII) being arranged to form one input and an output of said third converter ($A_{cE}$) being arranged to form another input of a second OR member (VIII) belonging to said first logic circuit means, said second OR member having an output, this output comprising as a first bit, a backward-c bit, adapted to be transmitted by said time-multiplex PCM transmission section in the backward direction, said second logic circuit means having a second two input AND member (VI), one input receiving the backward-c bit and the other input receiving a forward-c bit, a storage unit (Sp) for storing any forward-c bit during switching signal "occupy" this forward-c bit being transmitted in the forward direction by said time-multiplex PCM transmission section, and the output of said second AND member (VI) being connected to other AND members (II–V) belonging to said second logic circuit means said other AND members (II–V) having outputs coupled to control inputs of those switching means ($P_{aS}$, $M_{aS}$, $P_{bS}$) of said second plurality of switching means associated with first and second sending-side lines ($a_s$, $b_s$) of two lines ($a$, $b$) of said connecting lines ($a$, $b$, $c$).

6. A circuit arrangement according to claim 1, wherein the switching signal plan is the impulse signal plan IKZ 50 of the German Federal Post Office, wherein a first converter ($A_{aE}$) of said second plurality of signal converters which is connected to a first line ($a_e$) of said receiving-side lines of a first ($a$) connecting line of said connecting lines ($a$, $b$, $c$) has the following code scheme or logic table:

| Potential State in backward Direction of Connection Establishment | Output 1 | Output 2 |
|---|---|---|
| Negative potential | O | O |
| Positive potential | L | L |
| No-potential | L | O |

and a second converter ($A_{bE}$) of said second plurality of signal converters which is connected to a second line ($b_e$) of said receiving side lines of a second ($b$) connecting line of said connecting lines ($a$, $b$, $c$) has the same code scheme such that a second output of said first converter ($A_{aE}$) and a second output of said second converter ($A_{bE}$) constitute two inputs of a first OR member (I) on whose output there appears, as first bit a backward-a bit to be transmitted by said time-multiplex PCM transmission section in backward direction, said OR member belonging to said first logic circuit means and such that a first output of said second converter ($A_{bE}$) gives off a backward-b bit to be transmitted by said time-multiplex PCM transmission section in the backward direction.

7. A circuit arrangement according to claim 6, wherein a third converter ($A_{cE}$) of said second plurality of signal converters which is connected to a third line ($c_e$) of said receiving-side lines of a third line ($c$) of said connecting lines ($a$, $b$, $c$) has the following code scheme or logic table:

| Potential State in Backward Direction of | Output |
|---|---|
| Connection Establishment | |
| Negative potential | L |
| Positive potential | O |
| No-potential | O |

a first output of said second converter ($A_{bE}$) constituting an input of a first AND member (VII), said first AND member belonging to said first logic circuit means, said first logic circuit means having another input, this other input being a first output of said first converter ($A_{bE}$), a second of said first AND member (VII) being arranged to form one input and an output of said third converter ($A_{cE}$) being arranged to form another input of a second OR member (VIII) belonging to said first logic circuit means, said second OR member having an output, this output comprising as a first bit, a backward-c bit, adapted to be transmitted by said time-multiplex PCM transmission section in the backward direction, said second logic circuit means having a second two input AND member (VI), one input receiving the backward-c bit and the other input receiving a forward-c bit, a storage unit (Sp) for storing any forward-c bit during switching signal "occupy" this forward-c bit being transmitted in the forward direction by said time-multiplex PCM transmission section, and the output of said second AND member (VI) being connected to other AND members (II–V) belonging to said second logic circuit means, said other AND members (II–V) having outputs coupled to control inputs of those switching means ($P_{aS}$, $M_{aS}$, $P_{bS}$) of said second plurality of switching means associated with first and second sending-side lines ($a_s$, $b_s$) of two lines ($a$, $b$) of said connecting lines ($a$, $b$, $c$).

8. A circuit arrangement according to claim 6 further comprising at least one each suppressor ($U_{aS}$, $U_{bS}$, $U_{cS}$, $U_{aE}$, $U_{bE}$, $U_{cE}$) associated with a corresponding one of said converters ($A_{aS}$, $A_{bS}$, $A_{cS}$; $A_{aE}$, $A_{bE}$, $A_{cE}$) said one each suppressor being operatively connected to a corresponding one of said switching means forming said first and second pluralities of switching means ( $P_{aS}$, $M_{aS}$, $P_{bS}$, $M_{cS}$, $P_{aE}$, $M_{bE}$, $P_{cE}$), for the puprose of potential-loading at least one of said sending-side and receiving-side lines ($a_S$, $b_S$, $c_s$; $a_E$, $b_E$, $c_E$), and preventing the particular converter from operation upon activation of said one of said switching means.

9. A circuit arrangement according to claim 8 including on both sides of said time-multiplex PCM transmission section, immediately adjoining to that section, for each bit of signal words, one each delay storage unit (VS), said storage units each being arranged to route respective incoming bits on only when a certain predetermined minimum duration has been exceeded.

* * * * *